E. C. WRIGHT.
DYNAMO ELECTRIC MACHINE.
APPLICATION FILED JAN. 22, 1906.
949,106.
Patented Feb. 15, 1910.
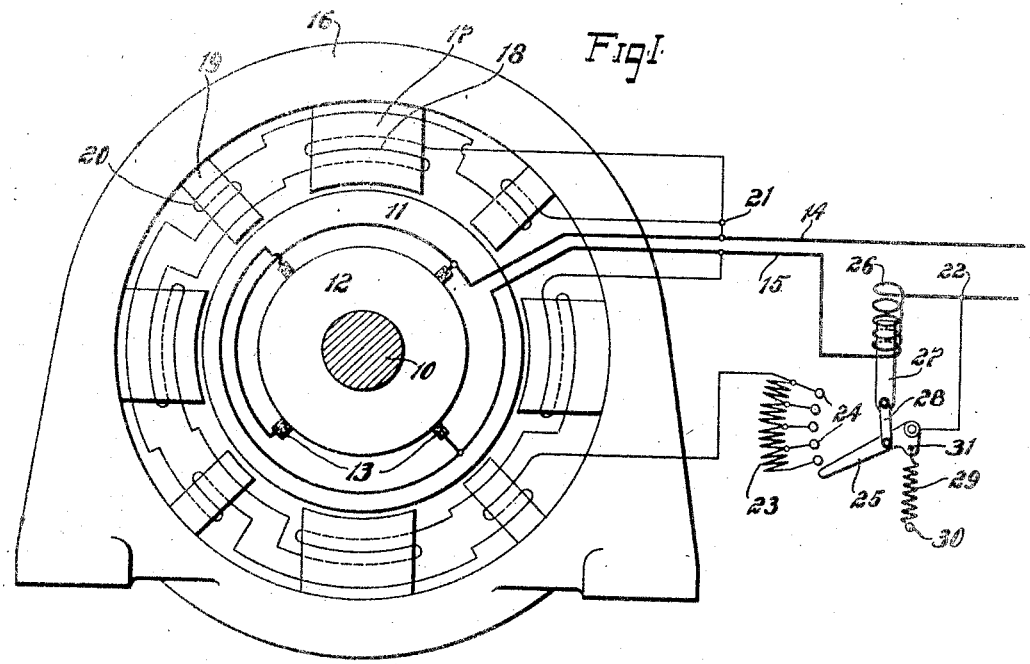
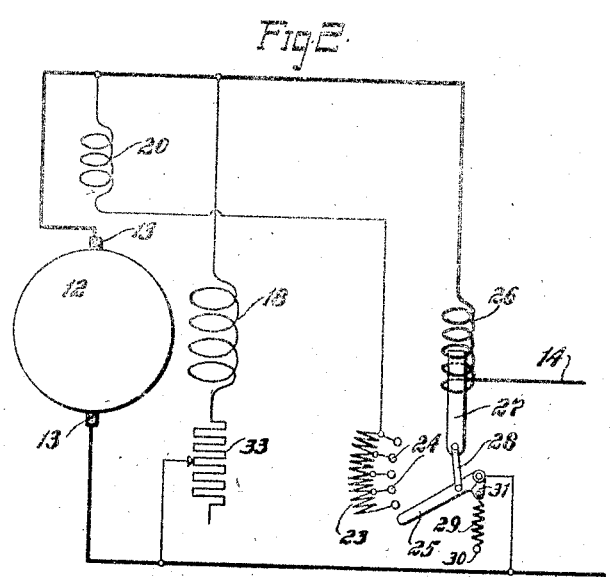
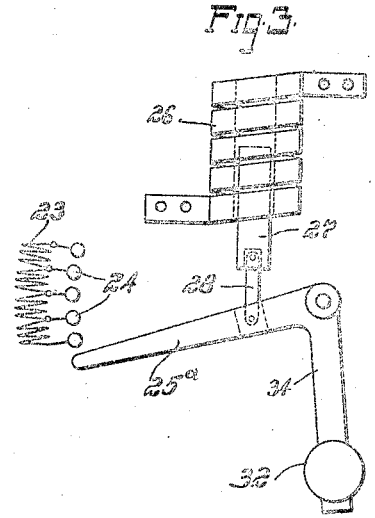
WITNESSES:
George J. Schwartz
Fred J. Kinsey
INVENTOR:
Edwin C. Wright.
BY
Chas. E. Lord
ATTORNEY.

UNITED STATES PATENT OFFICE.

EDWIN C. WRIGHT, OF NEWPORT, KENTUCKY, ASSIGNOR TO THE BULLOCK ELECTRIC MANUFACTURING COMPANY, A CORPORATION OF OHIO.

DYNAMO-ELECTRIC MACHINE.

949,106. Specification of Letters Patent. Patented Feb. 15, 1910.

Application filed January 22, 1906. Serial No. 297,137.

*To all whom it may concern:*

Be it known that I, EDWIN C. WRIGHT, citizen of the United States, residing at Newport, in the county of Campbell and State of Kentucky, have invented certain new and useful Improvements in Dynamo-Electric Machines, of which the following is a full, clear, and exact specification.

My invention relates to dynamo-electric machines having auxiliary field windings for preventing sparking at the brushes.

In a generator or a motor, the conductors of the auxiliary winding may be distributed about the armature adjacent the armature conductors, to balance the armature reaction, in which case it is known as a "balancing winding," and in an alternating current machine the auxiliary distributed winding serves also to neutralize the armature self induction in which case it is frequently called a "compensating winding," or the auxiliary winding may be arranged on auxiliary field poles intermediate the main field pole, for the purpose of creating commutating fields for the coils short-circuited by the brushes, windings so disposed being known as "commutating windings." In either case the auxiliary winding should carry current proportionate to the current in the armature winding, and it has heretofore been customary to connect such windings in series with the armature windings. In machines designed for generating heavy currents, this arrangement of the auxiliary winding in series with the armature winding presents several difficulties. On account of the very heavy currents which traverse these windings it is necessary to employ large copper conductors. Furthermore, to obtain the proper balancing field or commutating field and hence to obtain sufficient ampere-turns, very few turns or coils are needed. If the windings are distributed to balance the armature reaction and if the conductors of the balancing winding carry the entire armature current, it will be necessary to provide deep slots and to space them far apart. If the auxiliary winding is arranged on field poles for providing commutating fields, few turns will be necessary, and frequently fractions of turns having a heavy current flowing therethrough will provide the proper ampere-turns. It is therefore difficult under these circumstances to obtain exactly the proper commutating effect.

The object of my invention is to provide an auxiliary field winding which will have a relatively large number of turns of a conductor which is comparatively easy to wind and which will carry a current smaller than the armature current but proportionate thereto.

In carrying out my invention, I connect the auxiliary field winding in shunt to the armature circuit, and provide automatic means for varying the current in this auxiliary winding in proportion to variations in the armature current.

More specifically considered my invention consists in a dynamo-electric machine having an armature winding, a main field winding and an auxiliary field winding, which auxiliary field winding is in shunt to the armature winding and has in its circuit a variable resistance; I provide a solenoid having its coil in series with the armature circuit and having a movable plunger and lever arranged to cut in and out more or less of the resistance in circuit with the auxiliary winding to vary the current therein in proportion to variations of current in the armature winding. With this arrangement the current in the auxiliary winding may be as small as desired and a large number of conductors can be employed to obtain the proper ampere-turns.

For a better understanding of my invention, reference is had to the accompanying drawings in which—

Figure 1 is a conventional representation of a dynamo-electric machine embodying my invention, the auxiliary field winding being in this case a commutating winding, the coils of which are arranged intermediate the main field coils; Fig. 2 is a diagrammatic view showing the various windings and their connections; and Fig. 3 is a modification of the device employed for varying the current through the auxiliary field winding.

Referring now to the figures of the drawing, 10 represents the armature shaft on which are mounted the armature 11 and commutator 12. Brushes 13 are connected to the main armature terminals 14 and 15. The field frame 16 has inwardly projecting main field poles 17 provided with the coils 18 of the main field winding, (in this case a shunt winding), and auxiliary field poles 19 arranged intermediate the main field poles, which auxiliary field poles are provided with the coils 20 of the auxiliary field winding or commutating winding. This winding is also arranged in shunt to the armature circuit, connections thereto being made at 21 and 22. In circuit with the auxiliary winding is a variable resistance 23 having contacts 24 adapted to be engaged by the rheostat arm 25.

In order that the current in the auxiliary field winding may always be proportional to the current in the armature circuit, I provide automatic means responsive to changes in current of the armature circuit for regulating the amount of resistance in the auxiliary field circuit. For this purpose I provide a solenoid, the coil 26 of which is in series with the armature circuit and the plunger core 27 of which is connected by a link 28 to the rheostat arm 25. As the current varies in the solenoid coil, the plunger will be raised or lowered, moving the rheostat arm in a clockwise or counter-clockwise direction.

It is evident that means must be provided for obtaining approximately equal movements of the plunger 27 and rheostat arm 25 for equal increments of current. This result follows if the magnetic pull on the core varies as the current in the coil for different positions of the core, and if the core is restrained by a force, which for all the operative positions of the core, bears a fixed relation to the magnetic pull and varies proportionately therewith.

In Figs. 1, 2 and 3, means are shown whereby the current in the auxiliary winding is caused to vary proportionately to variations in the armature current. By experiment it is found that the magnetic pull on a solenoid core, between certain limiting positions of the core, is approximately constant with a given current in the coil. If the core is kept within these limiting positions throughout its working range, the magnetic pull on the core is approximately proportional to the current in the coil regardless of the position of the core. In Figs. 1 and 2 I have shown a spring 29 for constraining the movement of the rheostat arm and plunger, which spring is attached at one end to a stationary support 30 and at its other end to an extension 31 of the rheostat arm 25. The resistance contacts 24 are arranged closely together so that the rheostat arm 25 moves through a comparatively small angle in passing from its lowest to its highest position. The points of attachment of the spring, and the center of the pivot of the rheostat arm are in a straight line when the arm is in its lowermost position. It follows therefore that during the small angular movement of the rheostat arm and hence the small vertical movement of the plunger the length of the spring varies only to a small extent and that the turning moment due to the spring depends almost entirely on the effective lever arm of the spring or the distance of the point of attachment to the extension 31 from a vertical line drawn through the center of the pivot of the rheostat arm, and this distance varies with the position of the plunger. Equilibrium is obtained when the core reaches such a position that the forces are equal. Hence it follows that for equal increments of current there are equal vertical movements of the plunger and equal angular movements of the rheostat arm, and hence the current in the auxiliary shunt winding varies proportionately to variation of the current in the armature.

In Fig. 3, I have shown a modification of the regulating means. Instead of the spring 29, there is shown a weight 32 on a bell-crank lever 34, the rheostat arm 25ᵃ forming one arm of the lever. The position of the lever, when there is no current in the coil, is such that the center of gravity is in a vertical line drawn through the center of the pivot of the lever. The turning moment, for a small angular movement of the lever, depends, approximately, on the distance of the center of gravity from the vertical line drawn through the center of the pivot, and this depends on the position of the plunger. Hence the weight like the spring limits to a proper amount the vertical movements of the plunger for equal increments of current.

In Fig. 2 I have shown a variable resistance 33 in the main field circuit for varying the current therein. It is to be understood that I may have in the auxiliary field circuit, a manually adjustable resistance, in addition to the automatically adjustable resistance 23.

I do not wish to be confined to the details shown, nor to the specific types of windings nor to the exact connections shown. I aim in my claims to cover all such modifications which do not involve a departure from the spirit and scope of my invention.

What I claim as new and desire to secure by Letters Patent is:—

1. In a dynamo-electric machine, a main field winding, an auxiliary, spark-reducing field winding, said auxiliary field winding being in shunt to the armature circuit, and means for automatically varying the current in the auxiliary winding substantially in direct proportion to changes in the armature current.

2. In a dynamo-electric machine, a main field winding, an auxiliary, spark-reducing field winding arranged on poles intermediate the main field poles and connected across the armature terminals, and means responsive to changes in the armature current for varying the current through the spark-reducing winding.

3. In a dynamo-electric machine, main field poles, field coils thereon, auxiliary field poles intermediate the main field poles, an anti-sparking winding consisting of coils on said auxiliary field poles, said coils being connected in shunt to the armature terminals, and means for changing the current in the anti-sparking winding substantially in direct proportion to changes in the armature current.

4. In a dynamo-electric machine, an armature, a main field winding, an auxiliary field winding for reducing sparking at the brushes, said auxiliary winding being connected in shunt to the armature winding, and electro-magnetic responsive means for varying the current in said auxiliary winding substantially in direct proportion to variations in the armature current.

5. In a dynamo-electric machine, an armature, a main field winding, an auxiliary field winding for reducing sparking at the brushes, said auxiliary winding being connected in shunt to the armature winding, and means comprising a coil in series with the armature winding for regulating the current in the auxiliary field winding.

6. In a dynamo-electric machine, an armature, a main field winding, an auxiliary field winding in shunt to the armature winding, and electro-magnetic means comprising a coil in series with the armature winding for changing the current in the auxiliary field winding substantially in direct proportion to changes in the armature current.

7. In a dynamo-electric machine, an armature, a main field winding, an auxiliary, anti-sparking field winding in shunt to the armature terminals, a variable resistance in circuit with the auxiliary winding, and means responsive to changes in the armature current for varying the amount of resistance in the auxiliary field circuit inversely as said armature current.

8. In a dynamo-electric machine, an armature winding, a main field winding, an auxiliary field winding in shunt to the armature winding, a variable resistance in circuit with the auxiliary winding, and electro-magnetic means comprising a coil in series with the armature winding for varying the amount of resistance in series with the auxiliary field winding to change the current in the auxiliary field winding substantially in direct proportion to changes in the armature current.

9. In a dynamo-electric machine, an armature winding, a main field winding, an auxiliary field winding in shunt to the armature winding, a variable resistance in the auxiliary field winding circuit, a solenoid in series with the armature circuit, and a movable plunger coöperating with said solenoid for varying the current in said auxiliary winding substantially in direct proportion to changes in said armature winding.

10. In a dynamo-electric machine, a shunt-connected anti-sparking winding, and automatic means for varying the current in said winding substantially in direct proportion to the main current.

11. A dynamo-electric machine, having a shunt-connected commutating winding, and means for automatically varying the ampere turns of said winding.

12. A dynamo-electric machine having a shunt-connected anti-sparking winding, and means for automatically adjusting said winding.

13. A dynamo-electric machine having a main field winding and a shunt-connected anti-sparking winding, means for automatically varying the ampere turns of the anti-sparking winding and means for varying the effect of the main field winding.

14. A dynamo-electric machine having main field and commutating windings, means for automatically adjusting the effect of said commutating winding, and means for varying the main field strength.

15. The combination with a direct-current dynamo-electric machine having compensating field windings acting upon the armature coils undergoing commutation, of means for energizing said compensating windings, and an automatic controlling apparatus governing said energizing means, said apparatus being responsive to changes in the current through the armature circuit of said machine.

16. The combination with a direct-current dynamo-electric machine having compensating field windings acting upon the armature coils undergoing commutation, of a magnet in series with the armature circuit, and means for variably energizing said compensating field windings, controlled through the agency of said magnet.

17. The combination with a direct-current dynamo-electric machine having compensating field windings acting upon the armature coils undergoing commutation, of an energizing circuit for said compensating windings, distinct from the armature circuit, and means controlled by the variation of current flow in the armature circuit for varying the current in said energizing circuit.

18. The combination with a direct-current dynamo-electric machine having commutating poles facing the armature coils undergoing commutation, of an energizing circuit for said commutating poles, distinct from the armature circuit, a rheostat controlling the flow of current in said energizing circuit, and a solenoid included in series in the armature circuit, the core of said solenoid being arranged to operate said rheostat.

19. A dynamo-electric machine having a main field winding and an anti-sparking winding, and an automatically operated rheostat for varying the strength of said anti-sparking winding substantially in direct proportion to the armature current.

20. In a dynamo-electric machine, a main field winding, an anti-sparking winding connected otherwise than in series, and means for varying the current in said anti-sparking winding substantially in the same proportion as though it were connected in series.

In testimony whereof I affix my signature, in the presence of two witnesses.

EDWIN C. WRIGHT.

Witnesses:
ARTHUR F. KWIS,
FRED J. KINSEY.